United States Patent [19]

Stuber et al.

[11] Patent Number: 5,369,208
[45] Date of Patent: Nov. 29, 1994

[54] LOW VOC, FAST DRYING, MOISTURE CURABLE, ONE-COMPONENT ISOCYANATE-BASED COATING COMPOSITIONS

[75] Inventors: Fred A. Stuber, North Haven, Conn.; Michael M. Martinez, Fairporte, N.Y.; Michael J. Morgan, Torrington; Kiran B. Chandalia, Cheshire, both of Conn.

[73] Assignee: Olin Corporation, Cheshire, Conn.

[21] Appl. No.: 64,995

[22] Filed: May 24, 1993

[51] Int. Cl.$^5$ .............................................. C08G 18/02
[52] U.S. Cl. ........................................ 528/53; 528/59; 528/73; 528/85
[58] Field of Search .................. 528/53, 59, 73, 85; 427/445; 524/589

[56] References Cited

U.S. PATENT DOCUMENTS

| | | | |
|---|---|---|---|
| 4,124,569 | 11/1978 | Bock et al. | 528/61 |
| 4,292,350 | 9/1981 | Kubitza et al. | 427/385.5 |
| 4,456,658 | 6/1984 | Kubitza et al. | 428/424.6 |
| 4,523,003 | 6/1985 | Bezwada | 528/58 |

*Primary Examiner*—Morton Foelak
*Assistant Examiner*—Jeffrey Culpeper Mullis
*Attorney, Agent, or Firm*—Dale Lynn Carlson

[57] ABSTRACT

This invention relates to a process for coating a substrate other than polyvinyl chloride which comprises contacting said substrate with a fast drying, moisture curable, low volatility organic coating composition having a viscosity as measured by ZAHN cup 2 of less than about 200 seconds and consisting essentially of at least one polyisocyanate, a solvent in an amount of between 0% and 45% by weight based upon the amount of said polyisocyanate in said composition, and a tertiary amine catalyst, said composition being essentially free of any volatile mono- and di-isocyanates, and said composition being moisture curable upon exposure to atmospheric moisture. Also claimed is the coating composition itself.

8 Claims, No Drawings

LOW VOC, FAST DRYING, MOISTURE CURABLE, ONE-COMPONENT ISOCYANATE-BASED COATING COMPOSITIONS

FIELD OF THE INVENTION

This invention relates generally to moisture-curable coating compositions, and, more specifically to a process for coating substrates, other than polyvinyl chloride, with a low volatile organic (so-called "low VOC") coating composition which is suitably hardened under the influence of atmospheric moisture.

BACKGROUND OF THE INVENTION

One-component, moisture-curable, isocyanate-based coating formulations are well-known and are widely used. Generally, these compositions are based on isocyanate-terminated prepolymers and have a viscosity sufficiently high as to make application to substrates, especially by such techniques as spraying, readily achievable only by dilution with a solvent or solvent mixture to solids levels of 50% or less. However, due at least in part to the introduction of the Clean Air Act of 1970, coatings formulators are under pressure to reduce volatile organic compounds ("VOC") to as low a level as technological advances will allow. Therefore, it would be highly desirable to provide coatings with excellent properties associated with moisture-curable, isocyanate-based coatings, but which are inherently low in viscosity and require minimal or no dilution with solvent.

The use of one-component, isocyanate-based coating compositions in the production of coatings for substrates is known in the art, By way of illustration, U.S. Pat. No. 4,456,658 discloses a process for coating polyvinyl chloride sheet products with a clear coating comprising a binder which consists essentially of at least one polyisocyanate which is liquid at room temperature. The polyisocyanate binder is further characterized at column 2, lines 12-17 of the '658 patent as being in particular polyisocyanates containing biuret or isocyanurate groups and optionally uretidione groups and having an average isocyanate functionality above 2, preferably from about 2.5 to 6. Unfortunately, the '658 patent is limited to coating polyvinyl chloride sheet products, which represents a narrow market niche as compared to the wide variety of substrates in the marketplace that could benefit from a suitable one-component coating. The coating compositions of the examples of the '658 patent also have the disadvantage of slow drying times when cured at room temperature utilizing dibutyltin dilaurate as a catalyst.

As an additional illustration, U.S. Pat. No. 4,292,350 discloses a process of coating substrates comprising applying a solvent-free or low solvent lacquer composition containing as a binder an isocyanate mixture. The isocyanate mixture described in the '350 patent is a mixture of (a) an organic polyisocyanate having an average isocyanate functionality of greater than 2 which contains biuret, urethane and/or isocyanurate groups and has an isocyanate content of from about 13 to 30% by weight, and (b) at least one monoisocyanate having a defined structure. The monoisocyanate is further described at column 3, lines 18-22 of the '350 patent as being suitably prepared by reacting excess quantities of a diisocyanate with a hydrocarbon-containing hydroxyl compound, followed by removal of unreacted excess diisocyanate by distillation using, for example, a thin layer evaporator. The process of this patent is more cumbersome than might be desired, particularly in regard to the need for the isocyanate mixture and the need for removal of excess diisocyanate from the prepared monoisocyanate component.

A simpler process for coating a wide variety of substrates, not limited to the polyvinyl chloride substrate of the '658 patent and not employing the isocyanate mixture of the '350 patent, utilizing a room temperature coating composition having a fast drying time would be highly desired by the one-component urethane coatings community. The present invention provides such a simplified process.

SUMMARY OF THE INVENTION

In one aspect, the present invention relates to a process for coating a substrate, other than polyvinyl chloride, which comprises contacting said substrate with a low volatility organic (so-called "low VOC") coating composition having a viscosity as measured by ZAHN cup 2 of less than about 200 seconds (preferably between about 10 seconds and about 150 seconds), a solvent in an amount of between 0% and 45% (preferably between 0% and 35%, most preferably between 0% and about 30%) by weight based upon the amount of said polyisocyanate in said composition, and a tertiary amine catalyst, said composition being essentially free of any volatile mono- and di-isocyanates, and said composition being moisture curable upon exposure to atmospheric moisture.

In another aspect, the present invention relates to a low volatile-organics coating composition having a viscosity as measured by ZAHN cup 2 of less than about 200 seconds (preferably between about 10 seconds and about 150 seconds) and consisting essentially of at least one polyisocyanate, a solvent in an amount of between 0% and 45% (preferably between 0% and 35%, most preferably between 0% and about 30%) by weight based upon the amount of said polyisocyanate in said composition, and a tertiary amine catalyst, said composition being essentially free of any volatile mono- and di-isocyanates, and said composition being moisture curable upon exposure to atmospheric moisture.

These and other aspects will become apparent upon reading the following detailed description of the invention.

DETAILED DESCRIPTION OF THE INVENTION

The present invention provides a so-called "one-component" coating composition that has a very low VOC and is useful for coating a wide variety of non-PVC-containing substrates. The coating composition consists essentially of a polyisocyanate, a tertiary amine catalyst to facilitate moisture cure of the composition, and an optional solvent.

The coating composition of the present invention is a low volatility organic (so-called "low VOC") coating composition having a viscosity as measured by ZAHN cup 2 of less than about 200 seconds and consisting essentially of at least one polyisocyanate, a solvent in an amount of between 0% and 45% by weight based upon the amount of said polyisocyanate in said composition, and a tertiary amine catalyst, said composition being essentially free of any volatile mono- and di-isocyanates, and said composition being moisture curable upon exposure to atmospheric moisture. The coating composition is free of mono-ols and polyols normally required for use in the production of polyurethane coatings.

The ZAHN cup 2 test is performed in accordance with ASTM D4212-88. Briefly, the ZAHN cup 2 test is performed by dipping a measured cup having a bottom hole into the test composition, followed by removal of the cup and measurement of the amount of time in seconds until a break occurs in the flow stream of test composition passing through the bottom hole. For purposes of comparison, the viscosities as measured by Zahn cup No. 2 can be converted to approximate kinematic viscosities, if desired, by a computation using the following equation:

viscosity (in centistokes) = $2.93(t) - 500/(t)$ where t is the viscosity in seconds as measured by the Zahn cup No. 2 test regimen.

The polyisocyanates useful in the process of the present invention are those containing one or more of the following: biuret groups, isocyanurate groups (such as cyclotrimerized isocyanurate groups), uretdione groups, and combinations thereof. The polyisocyanate suitably has an average functionality of at least 2, preferably between 2.5 and 6. Suitable polyisocyanates include aliphatic polyisocyanates, aromatic polyisocyanates, and combinations thereof, but preferably at least some amount of an aliphatic polyisocyanate is employed in the process of the present invention. polyisocyanates containing aliphatically and/or cycloaliphatically bound isocyanate groups are preferred for the production of light-stable coatings.

The polyisocyanates are prepared by the known modification of simple organic diisocyanates, typically resulting in the formation of biuret, uretdione or isocyanurate groups, or the simultaneous formation of isocyanurate and uretidione groups. Any excess of unmodified monomeric starting diisocyanate still present after the modification reaction is suitably removed in a known manner, such as distillation, to provide a polyisocyanate that is essentially free of volatile diisocyanate. The term "essentially free of volatile diisocyanate" as used herein is intended to designate that the polyisocyanate contains no greater than 0.7%, preferably no greater than 0.5%, most preferably no greater than 0.2%, by weight of volatile diisocyanate based upon the weight of the polyisocyanate.

Diisocyanates suitable for use in the preparation of the polyisocyanates include, for example, 2,4- and/or 2,6 diisocyanatotoluene, 4,4'-diisocyanato-dicyclohexylmethane, hexamethylene diisocyanate ("HDI"),and 1-isocyanato-3,3,5-trimethyl-5-isocyanatomethylcyclohexane ("IPDI"), 1,4-butanediisocyanate, 1-methyl-2,4-diisocyanatocyclohexane, 1-methyl-2,6-diisocyanatocyclohexane, 4,4'-methylene-bis(cyclohexyl isocyanate), 2-methyl-1,5-diisocyanatopentane, 2-ethyl-1,4-diisocyanatobutane, 2,4,4-trimethylhexamethylene-1,6-diisocyanate, a,a'-diisocyanato-1,3-dimethylbenzene, a,a'-diisocyanato-1,3-dimethylcyclohexane, a,a'-diisocyanato-1,4-dimethylbenzene, a,a'-diisocyanato-1,4-dimethylcyclohexane, 1,3-diisocyanatocyclohexane, 1,4-diisocyanatocyclohexane wherein "a" denotes "alpha". The polyisocyanates may also be suitably prepared from mixtures of these, or other polyisocyanates. Preferably, aliphatic or cycloaliphatic diisocyanates such as HDI or IPDI are utilized as starting materials for preparing the polyisocyanates. HDI is the most preferred starting material for the preparation of polyisocyanates. Thus most preferred polyisocyanates include tris-(isocyanatohexyl)-biuret, tris-(isocyanatohexyl)-isocyanurate, cyclodimerized HDI and mixtures thereof, as well as mixtures of these oligomeric polyisocyanates with their higher homologues. Trimerized HDI is available under the trademark of LUXATE, a product of Olin Corporation, as well as under the trademark Desmodur N-3300, a product of Miles Inc.

Suitable catalysts for use in the process of the present invention which promote the water-isocyanate reaction include hydroxyl-free tertiary amine catalysts, as well as hydroxyl-containing tertiary amine catalysts. Suitable tertiary amine catalysts include the following: bis(N,N'-dimethylaminoethyl)ether, tris(dimethylaminopropyl)amine, N,N'-dimethylpiperazine, pentamethyl,dipropylene triamine.

Preferred catalysts are hydroxyl-containing tertiary amines, including N,N'-dimethylethanolamine, N,N-dimethylamino-ethoxyethanol, N,N'-dimethylaminoethyl-N-methylethanolamine, N,N-dimethyl-N',N'-2-hydroxypropyl-1,3-propylene didmine, N,N,N'-trimethyl-N'-hydroxyethylbis(amino ethyl) ether, N,N-bis(3-dimethylaminopropyl) amino-2-propanol. The catalyst is suitably employed in an amount of between about 0.1% and about 5%, based upon the weight of the coating composition. Optionally, additional catalysts which promote polymer-forming reactions with the polyisocyanates, particularly reactions of the isocyanate with alcohol are suitably uses, and the use of these additional catalyst(s) is preferred. Such additional catalysts, for example dibutyltin dilaurate, and stannous octoate, are suitably employed in an amount of between about 0.01% and about 5%, preferably between about 0.01% and about 1%, by weight based upon the weight of the coating composition.

The coating compositions employed in the process of the present invention suitably contain small quantities of isocyanate-inert solvents in amounts of between 0% and 45% by weight, based upon the weight of the coating composition. It is preferred to minimize the amount of solvent utilized in the coating compositions of the present invention in order to minimize the VOC of the coating composition itself. However, some amount of solvent may be required in order to provide a desired low viscosity for the coating composition of less than about 200 seconds as measured by Zahn cup #2. Suitable solvents include toluene, xylene, butyl acetate, methyl ethyl ketone, methyl isobutyl ketone, methylamyl ketone, ethylethoxy propionate, ethoxyethylacetate, an aromatic hydrocarbon mixture having a boiling point of 152–174° C., combinations thereof, and the like. Other optional additives are suitably employed, if desired, such as, for example, uv stabilizers; leveling agents; flow-aids; pigments, such as titanium dioxide; plasticizers; and/or other resins.

The coating compositions made in accordance with the process of the present invention are suitable for use in the production of clear or pigmented coatings, and may be applied to a desired substrate by conventional methods, such as spread coating, roller application or spraying. Because of the low viscosity of the compositions of the present invention, they are especially suitable for application by conventional spray techniques. The coating thickness on the substrate can vary over a wide range, although a dry film coating thickness of between about 0.01 and 0.5 millimeters is preferred.

Substrates for the coating useful in the present invention are suitably selected from a wide range of non-PVC materials such as other plastics, such as polyethylene or polystyrene, wood and paper substrates, and metal substrates, such as sheet steel or aluminum.

The coating compositions of the present invention are stable in storage when atmospheric moisture is excluded and they are suitably cured under the influence of moisture over a broad range of temperatures to form coatings. The moisture necessary for the reaction may be available as atmospheric moisture, although moisture may be supplied artificially, such as by steam in continuous plant processing or as a separate moisture additive in very dry climates where little atmospheric moisture is present. Hardening or curing of the coatings obtained from the use according to the invention is preferably carried out at room temperature with dry times of between about 30 minutes to about three hours, but it may also be conducted at elevated temperatures. For example, temperatures in excess of 100° C., or even 150° C., may be utilized to obtain typical dry times of less than one hour.

The coatings of the present invention are suitable for use in the production of automotive clear coatings or undercoats, floor covering coatings, wall coatings, transportation coatings, maintenance coatings, and the like, or any other application where a low VOC coating composition is desired for use on a substrate.

The following examples are intended to illustrate, but in no way limit the scope of, the present invention.

While the invention has been described above with reference to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

EXAMPLES

The following products were utilized in the examples given hereinbelow:

Polyisocyanate A is a trimerized hexamethylene diisocyanate.

Polyisocyanate B is a mixture of tris(isocyanatohexyl)-isocyanurate and bis-(isocyanatohexyl)-uretidione prepared by phosphine-catalyzed oligomerization of hexamethylene diisocyanate followed by removal of excess hexamethylene diisocyanate by distillation. Isocyanate content=22.9% by weight, hexamethylene diisocyanate content=0.10% by weight, viscosity about 65 cps at 25° C.

Catalyst A is 2-((2-(2-(dimethylamino)ethoxy)ethyl)-methylamino)ethanol and sold under the trademark Texacat ZF-10, a product of Texaco.

Flow-aid A is an acrylic flow and leveling agent sold as a 60% solids solution in xylene under the trademark Coroc A-620-A2, a product of Freeman Polymers.

EXAMPLE 1

A 16 oz. wide-mouth bottle was charged with 60 g of ethylethoxypropionate (EEP), 2.25 g of Catalyst A, 0.6 g of Flow Aid A, and 120 g of Polyisocyanate A. The resulting mixture was then stirred with a spatula to produce a homogenous clear solution. The resultant coating composition had a viscosity of 24 seconds by No. 2 Zahn cup at 20° C. The coating composition was stored in the absence of moisture until applied to the substrate. The coating composition contained 32.8% solvent by weight.

EXAMPLES 2-6

Using the procedure described in Example 1 the following coating compositions were prepared. The viscosity of the resulting coating compositions was suitable for use in spray processing.

EXAMPLES 7-12

The coating compositions prepared in Examples 1-6 were sprayed at 45 psi using a conventional spray gun (model #DH6500 from Minks Mfg. Co. ) on cold-rolled steel panels. A small portion of the coating composition was used to coat a glass strip which was placed in a MK Drying Recorder (Paul N. Gardner Company, Inc. ) to determine the drying time. The recorder uses a tracking needle to determine the solvent evaporation time, the gel time, and the surface-dry time. The drying time determinations were made at 20° C. and 50% relative humidity.

The coated test panels were allowed to cure at ambient temperature and humidity conditions for two weeks before testing for appearance, mechanical properties, and chemical resistance. Pencil hardness was determined according to ASTM D3363-92a. The conical mandrel bend tests were performed using a one-eighth inch tester from BYK-Gardner, Inc. according to ASTM D522-92. Direct and reverse impact values were determined according to ASTM D2794-92 using a variable height impact tester from BYK-Gardner, Inc. Gloss was determined using a micro-TRZ-gloss, multi-angle glossmeter from BYK-Gardner, Inc. Cross-hatch adhesion was determined using a cross-hatch cutter from BYK-Gardner according to ASTM D3359-92a. Chemical resistance was determined according to ASTM D1308-87. The results are presented in Table 2 below. Although most of the coatings properties show in the table are acceptable for a wide variety of applications, those showing a poor result in one or two properties would be suitably utilized in applications not requiring those properties.

TABLE I

| | COATING COMPOSITION COMPONENTS | | | | | VISCOSITY | |
|---|---|---|---|---|---|---|---|
| EXAMPLE | POLYISO-CYANATE TYPE | POLYISOCYANATE AMOUNT (g) | CATALYST A AMOUNT (g) | EEP AMOUNT (g) | FLOW-AID A AMOUNT (g) | VISCOSITY ZAHN #2 (sec) | SOLVENT WEIGHT % |
| 2 | A | 120 | 2.25 | 60 | 0.6 | 24 | 32.8% |
| 3 | A | 100 | 1.5 | 60 | 0.6 | NT* | 37.0% |
| 4 | A | 100 | 1.5 | 60 | 0.6 | 24 | 37.0% |
| 5 | B | 100 | 1.5 | 1 | 0 | NT* | 1.0% |
| 6 | B | 100 | 1.5 | 1 | 0 | 24 | 1.0% |

*"NT" denotes "not tested".

TABLE 2

| | | COATING COMPOSITION PROPERTIES | | | | | | | |
|---|---|---|---|---|---|---|---|---|---|
| EX-AM-PLE | COATING COMPO-SITION | SOLVENT EVAPOR-ATION (min) | GEL TIME (min) | SUR-FACE DRY (min) | THICK-NESS (mils) | PENCIL HARD-NESS | MAN-DREL BEND | DIRECT IMPACT (in/lb) | REVERSE IMPACT (in/lb) |
| 7 | Example 1 | 15 | 40 | 100 | 1.8 | 5 | PASS | 110 | 20 |
| 8 | Example 2 | 15 | 40 | 100 | 2.22 | 5 | PASS | 160 | 160 |
| 9 | Example 3 | 20 | 35 | 90 | 2.01 | 5 | PASS | 80 | 20 |
| 10 | Example 4 | 20 | 35 | 90 | 2.18 | 5 | FAIL | 60 | 20 |
| 11 | Example 5 | 15 | 30 | 60 | 3.18 | 6 | PASS | 160 | 160 |
| 12 | Example 6 | 15 | 30 | 60 | 3.66 | 6 | PASS | 160 | 160 |

| | | COATING PROPERTIES | | | | | | | |
|---|---|---|---|---|---|---|---|---|---|
| | | | | CROSS HATCH | CHEMICAL RESISTANCE | | | | |
| EX-AM-PLE | COATING COMPO-SITION | GLOSS (60°) | GLOSS (20°) | AD-HESION | NaOH (10%) | HCl (10%) | CH3COOH (10%) | MEK RUB | XYLENE RUB |
| 7 | Example 1 | 100% | 81% | FAIL | PASS | PASS | PASS | PASS | PASS |
| 8 | Example 2 | 90% | 60% | FAIL | PASS | PASS | PASS | PASS | PASS |
| 9 | Example 3 | 95% | 72% | FAIL | PASS | PASS | PASS | PASS | PASS |
| 10 | Example 4 | 101% | 87% | FAIL | PASS | PASS | PASS | PASS | PASS |
| 11 | Example 5 | 12% | 38% | PASS | PASS | PASS | PASS | PASS | PASS |
| 12 | Example 6 | 2% | 7% | PASS | PASS | PASS | PASS | PASS | PASS |

What is claimed is:

1. A coating composition having a viscosity as measured by ZAHN cup 2 of less than about 200 seconds and consisting essentially of at least one aliphatic or cycloaliphatic polyisocyanate, or combination thereof, a solvent in an amount of between 0% and 45% by weight based upon the amount of said polyisocyanate in said composition and containing no greater than 0.7% volatile diisocyanates based upon the weight of the polyisocyanate, and a tertiary amine catalyst in an amount of between about 0.1% and about 5% based upon the weight of the coating composition selected from the group consisting of N,N'-dimethylethanolamine, N,N-dimethylamino-ethoxyethanol, N,N'-dimethylaminoethyl-N-methylethanolamine, N,N-dimethyl-N',N'-2-hydroxypropyl-1,3-propylene diamine, N,N,N'-trimethyl-N'-hydroxyethyl-bis)amino ethyl) ether, N,N-bis(3-dimethylaminopropyl) amino-2-propanol, and combinations thereof, said composition being moisture curable upon exposure to atmospheric moisture.

2. The composition of claim 1 which is solvent-free.

3. The composition of claim 1 wherein said solvent is selected from the group consisting of toluene, xylene, butyl acetate, methyl ethyl ketone, methyl isobutyl ketone, methylamyl ketone, ethoxyethylacetate, ethylethoxy propionate and combinations thereof.

4. The composition of claim 1 wherein said polyisocyanate has an average functionality of least 2.

5. The composition of claim 4 wherein said average functionality is between 2.5 and 6.

6. The composition of claim 1 wherein said polyisocyanate is a biuret, dimer or trimer of an aliphatic diisocyanate.

7. The composition of claim 6 wherein said polyisocyanate is an aliphatic polyisocyanate prepared from hexamethylene diisocyanate.

8. The composition of claim 1 wherein said polyisocyanate is selected from the group consisting of tris-(isocyanatohexyl)-biuret, tris-(isocyanatohexyl)-isocyanurate, cyclodimerized isocyanurate and combinations thereof and higher oligomers.

* * * * *